United States Patent
Lv et al.

(10) Patent No.: US 12,320,430 B2
(45) Date of Patent: *Jun. 3, 2025

(54) ELECTRIC VALVE

(71) Applicant: ZHEJIANG SANHUA COMMERCIAL REFRIGERATION CONTROLS CO., LTD., Zhejiang (CN)

(72) Inventors: Ming Lv, Zhejiang (CN); Baijiang Qian, Zhejiang (CN)

(73) Assignee: ZHEJIANG SANHUA COMMERCIAL REFRIGERATION CONTROLS CO., LTD., Shaoxing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/495,329

(22) Filed: Oct. 26, 2023

(65) Prior Publication Data

US 2024/0068574 A1 Feb. 29, 2024

Related U.S. Application Data

(63) Continuation of application No. 17/312,334, filed as application No. PCT/CN2020/082916 on Apr. 2, 2020, now Pat. No. 11,835,145.

(30) Foreign Application Priority Data

Apr. 2, 2019 (CN) .......................... 201910260394.7
May 8, 2019 (CN) .......................... 201910381370.7

(51) Int. Cl.
*F16K 1/46* (2006.01)
*F16K 1/36* (2006.01)
*F16K 31/06* (2006.01)

(52) U.S. Cl.
CPC ................ *F16K 1/36* (2013.01); *F16K 1/465* (2013.01); *F16K 31/0655* (2013.01)

(58) Field of Classification Search
USPC .................................................. 251/264, 333
See application file for complete search history.

(56) References Cited

U.S. PATENT DOCUMENTS 2,616,653 A * 11/1952 Tarr .......................... F16K 1/46
                                                                    251/364
4,316,598 A *  2/1982 Maggio ................. F16K 17/105
                                                                    251/63
2009/0278068 A1  11/2009 Cho et al.

FOREIGN PATENT DOCUMENTS

CN          101166924 A       4/2008
CN          103133701 A       6/2013
(Continued)

OTHER PUBLICATIONS

International Search Report dated May 28, 2020 for PCT application No. PCT/CN2020/082916.

*Primary Examiner* — Matthew W Jellett
(74) *Attorney, Agent, or Firm* — Ohlandt, Greeley and Perle, L.L.P.

(57) ABSTRACT

An electric valve includes a valve seat component, and a valve core component. The valve seat component includes a valve seat and a sealing ring. The valve core component includes a valve core. The valve core includes a lower section, and the lower section is annular. The valve seat component further includes an inner bushing and a pressure block. The valve seat includes an axial through hole, and at least part of the inner bushing is arranged in the axial through hole. The sealing ring is arranged between an outer side of the inner bushing and the valve seat. The valve seat (Continued)

includes a first stepped portion, and a lower end surface of the pressure block is abutted against the first stepped portion and/or the sealing ring.

14 Claims, 9 Drawing Sheets

(56) References Cited

FOREIGN PATENT DOCUMENTS

| | | | |
|---|---|---|---|
| CN | 203756982 | A | 8/2014 |
| CN | 104791497 | A | 7/2015 |
| CN | 104791502 | A | 7/2015 |
| CN | 104964054 | A | 10/2015 |
| CN | 205207692 | U | 5/2016 |
| CN | 108019535 | A | 5/2018 |
| CN | 208519189 | U | 2/2019 |
| JP | 2016118223 | A | 6/2016 |
| JP | 2017180639 | A | 10/2017 |

* cited by examiner

ELECTRIC VALVE

The present application is a continuation application of U.S. patent application Ser. No. 17/312,334, titled "ELECTRIC VALVE", filed on Jun. 9, 2021, which claims the benefit of priorities to International Application No. PCT/CN2020/082916, filed on Apr. 2, 2020, Chinese Patent Application No. 201910260394.7, titled "ELECTRIC VALVE", filed with the China National Intellectual Property Administration on Apr. 2, 2019, and Chinese Patent Application No. 201910381370.7, titled "ELECTRIC VALVE", filed with the China National Intellectual Property Administration on May 8, 2019, all of which are incorporated herein by reference thereto in their entireties.

FIELD

The present application relates to the technical field of fluid control, and in particular to an electric valve.

BACKGROUND

FIG. 11 is a schematic diagram of a partial structure of an electric valve in the background technology. The electric valve as shown in FIG. 11 includes a valve seat 01, a fluid inlet 02 and a fluid outlet 03. The valve seat 01 includes a valve port portion 011, a valve core 04 can axially move to abut against or separate from the valve port portion 011 to close or open a valve port 012 of the electric valve. How to reduce the internal leakage when the electric valve is closed is a technical problem that those skilled in the art are constantly trying to solve.

SUMMARY

An object of the present disclosure is to provide an electric valve, which has reduced internal leakage when the electric valve is closed.

The electric valve according to the present disclosure includes a valve body component, a valve seat component, and a valve core component arranged in an inner chamber of the valve body component. The valve core component includes a valve core, the valve core is substantially tubular, the valve core includes a body portion and a lower section, and the lower section is substantially annular. The lower section has a substantially uniform outer diameter and a substantially uniform inner diameter. The valve seat component includes a first sealing portion, and an end of the lower section is configured to abut against or separate from the first sealing portion. The valve body component includes a bushing component. The valve core component includes a second sealing portion, the valve core component is in sliding fit with the bushing component through the second sealing portion, and the second sealing portion abuts against an inner wall of the bushing component. The inner chamber includes a first chamber located above the valve core component, the valve core component includes an equalizing flow path, and when the lower section is abutted against the first sealing portion, the first chamber is communicated with a first fluid port of the electric valve through the equalizing flow path. An axial projection circular line of an outer edge of the second sealing portion on the cross section of the lower section has a diameter D1. The lower section has an outer diameter D2 and an inner diameter D3. D1, D2, and D3 satisfy the following relationship: $0.2 \text{ mm}^2 \leq D1*(D2-D3) \leq 6 \text{ mm}^2$.

In the electric valve provided by the present application, the lower section is substantially annular, the lower section has the substantially uniform outer diameter and the substantially uniform inner diameter, the valve core component includes the second sealing portion, the axial projection circular line of the outer edge of the second sealing portion on the lower section has the diameter D1, and the lower section has the outer diameter D2 and the inner diameter D3. D1, D2, and D3 satisfy: $0.2 \text{ mm}^2 \leq D1*(D2-D3) \leq 6 \text{ mm}^2$, so as to reduce the internal leakage of the electric valve when the valve is closed.

DETAILED DESCRIPTION OF THE EMBODIMENTS

Figure 1:
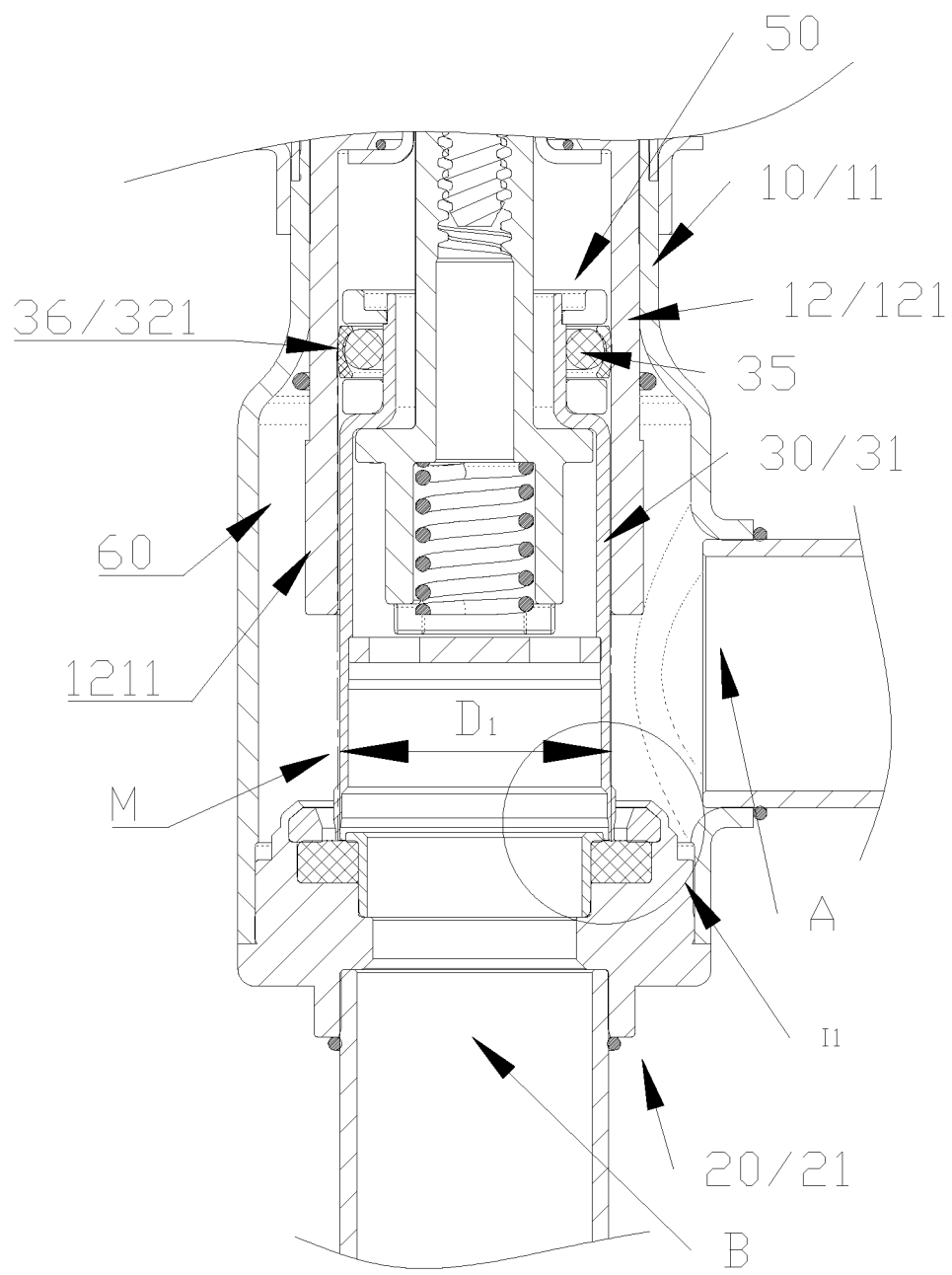
FIG. 1 is a schematic structural view of an electric valve in a closed state provided according to the present disclosure.

In order to enable those skilled in the art to better understand the technical solutions of the present disclosure, the present disclosure will be further described in detail with reference to the drawings and specific embodiments.

It should be noted here that, the orientation terms, such as up and down, involved in this application are defined with the components being located at the positions shown in the drawings of the application, which are only for clarity and ease of description of the technical solutions. It will be appreciated that, those orientation terms used herein should not limit the protection scope of the present application.

The "fixedly connected" herein refers to that two components may be directly fixedly connected, or two components may be fixedly connected by other components, that is, two components are indirectly fixedly connected.

Figure 2:
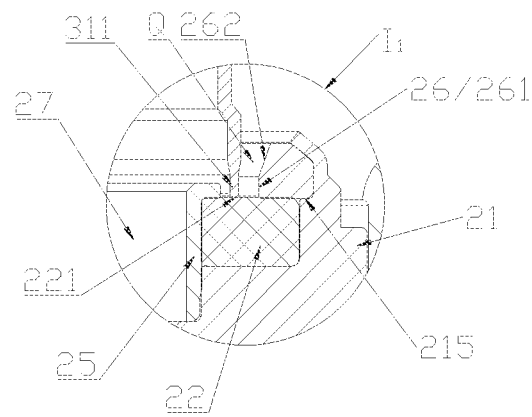
FIG. 2 is a partially enlarged view of portion 11 in FIG. 1.
Figure 3:
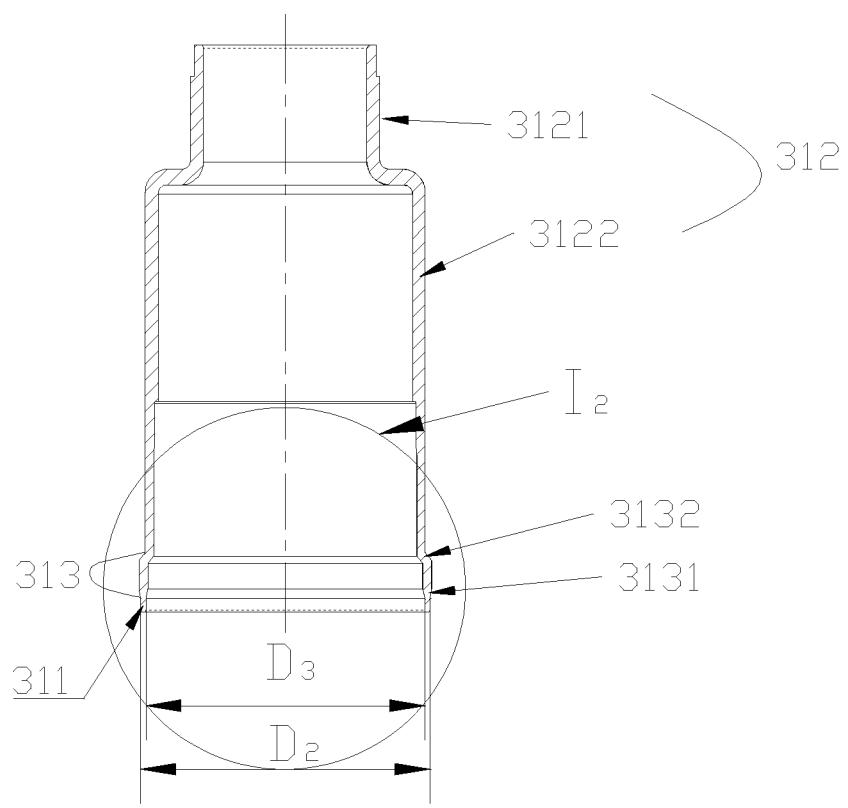
FIG. 3 is a schematic structural view of the valve core in FIG. 1.
Figure 4A:
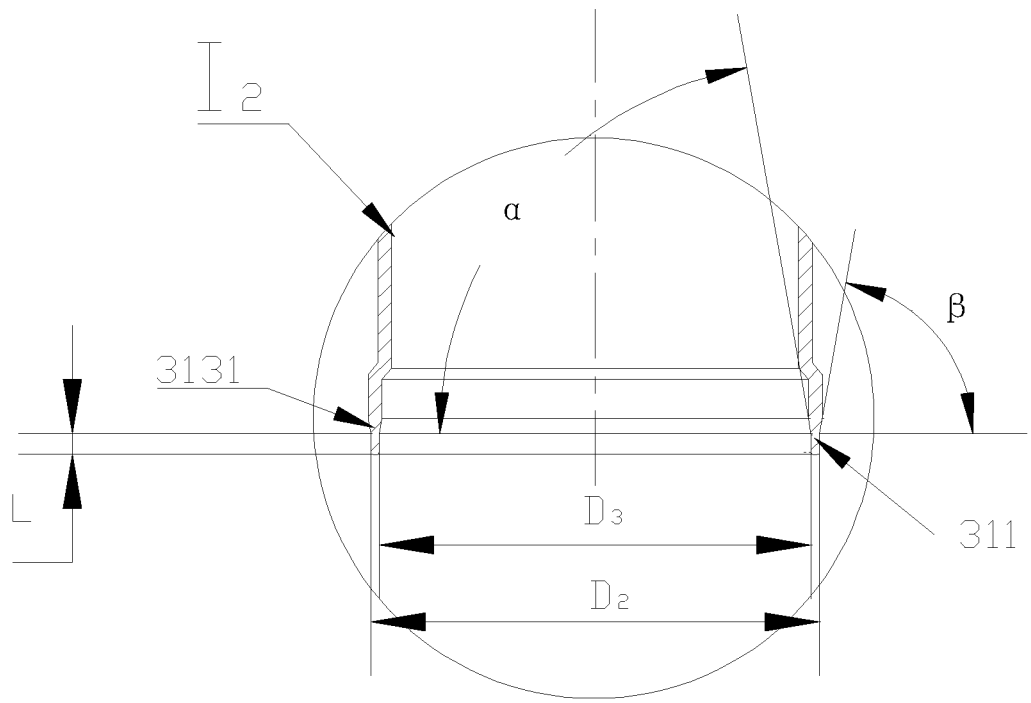
FIG. 4A is a partially enlarged view of portion 12 in FIG. 3.

FIG. 1 is a schematic structural view of an electric valve according to the first embodiment of the present disclosure. FIG. 2 is a partially enlarged view of portion 11 in FIG. 1. FIG. 3 is a schematic structural view of the valve core in FIG. 1. FIG. 4A is a partially enlarged view of portion 12 in FIG. 3.

As shown in FIGS. 1 to 3, FIGS. 4A, 4B, 4C and 4D, the electric valve includes a valve body component 10, a valve seat component 20, a valve core component 30, and a sealing assembly. The valve body component 10 includes a valve body 11, and a second fluid port A is defined on the valve body 11. The valve seat component 20 includes a valve seat 21 and a sealing ring 22, and a first fluid port B is defined on the valve seat 21. The valve core component 30 is disposed in an inner chamber of the valve body component 10, and the valve core component 30 includes a valve core 31, and the valve core 31 is substantially tubular. The valve core 31 includes a circular lower section 311 (which here not only refers to a ring with an absolute uniform outer diameter and an absolute uniform inner diameter, also refers to a ring with a little irregularity due to such as tolerance), the inner diameter of the lower section 311 is set to be substantially uniform, and the outer diameter of the lower section 311 is set to be substantially uniform. The sealing ring 22 includes a first sealing portion 221, and an end of the lower section 311 is configured to abut against or separate from the first sealing portion 221 to allow the second fluid port A to be communicated with the first fluid port B or not. The valve body component 10 further includes a bushing component 12, the valve core component 30 includes a second sealing portion 321, the valve core 31 is in sliding fit with the bushing component 12 through the second sealing portion 321, and the second sealing portion 321 abuts against an inner wall of the bushing component 12. The inner chamber of the valve body component 10 includes a first chamber 50 located above the valve core component 30. The valve core component 30 includes an equalizing flow path E. When the valve core 31 is abutted against the sealing ring 22, the first chamber 50 is not communicated with the second fluid port A, and the first chamber 50 is communicated with the first fluid port B through the equalizing flow path E. With reference to the drawings, it can be understood that such a design is beneficial to the force balance of the valve core component 30.

Specifically, as shown in FIG. 3, the valve core 31 includes a body portion 312, and the body portion 312 of the valve core 31 includes a small-diameter section 3121 and a large-diameter section 3122, that is, an outer diameter of the large-diameter section 3122 is greater than an outer diameter of the small-diameter section 3121. The bushing component 12 includes a bushing 121, an outer wall of the bushing 121 is fixed to the valve body component 10 by welding, the bushing 121 includes a first tubular portion 1211 which is substantially tubular, and the first tubular portion 1211 has a substantially uniform inner diameter. The valve core component 30 further includes the sealing assembly, and the sealing assembly is abutted between an outer wall of the small-diameter section 3121 and an inner wall of the first tubular portion 1211. Specifically, the sealing assembly includes a sealing ring 35 and a gasket 36. The large-diameter section 3122 of the body portion 312 is slidable relative to the inner wall of the first tubular portion 1211. The sealing ring 35 is arranged between the gasket 36 and the small-diameter section 3121, an inner wall of the sealing ring 35 is abutted against the outer wall of the small-diameter section 3121, and an outer wall of the gasket 36 is abutted against the inner wall of the first tubular portion 1211, so as to form a dynamic seal between the valve core 31 and the bushing component 12. The dynamic seal means that, the sealing assembly is slidable relative to the bushing 121, and the sealing assembly also forms a seal between the valve core component 30 and the bushing 121, that is, the side above the sealing assembly and the side below the sealing assembly are not communicated at this location. The gasket 36 includes the second sealing portion 321. An axial projection circular line of an outer edge of the second sealing portion 321 on the lower section 311 has a diameter D1. In this embodiment, the inner diameter of the first tubular portion 1211 is D1. The lower section 311 has an outer diameter D2 and an inner diameter D3. The diameter D1 of the axial projection circular line of the outer edge of the second sealing portion 321 on the lower section 311, the outer diameter D2 of the lower section 311, and the inner diameter D3 of the lower section 311 satisfy the following relationship: $1\ mm^2 \leq D1*(D2-D3) \leq 6\ mm^2$, so as to reduce the internal leakage of the electric valve when the valve is closed.

Since D1, D2, and D3 satisfy the relationship: $D1*(D2-D3) \geq 1\ mm^2$, the wall of the lower section 311 may not be too thin under the condition that the diameter D1 of the axial projection circular line is kept unchanged, which is convenient for processing. On the other hand, the strength reliability of the valve core 31 is acceptable, and the sealing reliability is acceptable. Furthermore, when the valve core 31 is abutted against the sealing ring 22 described below to close the valve, if the sealing ring 22 is made of a soft material, such as a rubber material, such design reduces the risk that the lower section 311 exceeds the material bearing limit of the sealing ring 22, reduces the impact of the lower section 311 of the valve core 31 on the sealing ring 22, and is beneficial to extending the service life of the sealing ring, so that the valve core 31 is better matched with the sealing ring 22, which reduces the internal leakage when the electric valve is closed, and is beneficial to the closing reliability of the electric valve.

The range of the formula $D1*(D2-D3)$ is given above, and the lower limit of the range is $1\ mm^2$. It is understandable that the lower limit of the formula $D1*(D2-D3)$ may be adjusted according to the material of the sealing ring 22. Under the premise that the sealing ring 22 is made of a soft material, if the hardness of the material is relatively high, the lower limit may be adjusted to be relatively smaller, and the range of the formula $D1*(D2-D3)$ becomes larger; if the hardness of the material is relatively low, the lower limit may be adjusted to be relatively larger, and the range of the formula $D1*(D2-D3)$ becomes relatively smaller. The lower limit may be adjusted to the smallest $0.2\ mm^2$, that is, $D1*(D2-D3) \geq 0.2\ mm^2$, which can still achieve the object of reducing the internal leakage when the electric valve is closed. For example, in a case that the sealing ring 22 is made of a PTFE plastic, the hardness of the PTFE plastic is higher than that of the common rubber material, so that the limit of the (D2−D3) may be adjusted to $0.2\ mm^2$.

In a case that the diameter D1 of the axial projection circular line is kept unchanged, if $D1*(D2-D3) \leq 6\ mm^2$, the opening resistance of the electric valve is optimized, and the internal leakage is reduced when the electric valve is closed, which is beneficial to the reliability of opening the electric valve. The specific configuration will be further described in detail in the following.

Moreover, the sealing ring 22 is made of a soft material to improve the sealing performance when the electric valve is closed. Specifically, the sealing ring 22 is made of a rubber material such as nitrile rubber. The end of the lower section 311 of the valve core 31 is configured to abut against or separate from the first sealing portion 221 to allow the second fluid port A to be communicated with the first fluid port B or not. The "not communicated" here means that the electric valve is occluded if there is no internal leakage. However, in the actual product, a little internal leakage may still exist due to process and other reasons. Therefore, one of the effects of this application is to reduce the internal leakage, and the ideal object is to eliminate internal leakage. When the end of the lower section 311 of the valve core 31 is abutted against the first sealing portion 221, the inner chamber of the valve body component 10 includes a second chamber 60 located between the valve core 31 and the valve body component 10, that is, the second chamber 60 refers to a space of the inner chamber of the valve body component which is located outside the valve core component and is not communicated with the first chamber 50. When there is no internal leakage in the abutment between the valve core 31 and the first sealing portion 221, the second chamber 60 is not communicated with the first fluid port B.

Due to the material properties of the sealing ring 22, a radial dimension of the lower section 311 of the valve core 31 is arranged to satisfy 0.1 mm<D2−D3<0.6 mm, so that D2−D3>0.1 mm, which is convenient for processing the valve core 31, and reduces the damage to the sealing ring 22 when the lower section 311 of the valve core 31 is abutted against the sealing ring 22 to close the electric valve.

The range of the formula (D2−D3) is given above, and the lower limit of the range is 0.1 mm. As described above, that the lower limit of the formula (D2−D3) may be adjusted according to the material of the sealing ring 22. Under the premise that the sealing ring 22 is made of a soft material, if the hardness of the material is relatively high, the lower limit may be adjusted to be relatively smaller, and the range of the formula (D2−D3) becomes larger; if the hardness of the material is relatively low, the lower limit may be adjusted to be relatively larger, and the range of the formula (D2−D3) becomes relatively smaller. The lower limit may be adjusted to the smallest 0.05 mm, that is, (D2−D3)≥0.05 mm. For example, in a case that the sealing ring 22 is made of a PTFE plastic, the hardness of the PTFE plastic is higher than that of the common rubber material, so that the limit of the (D2−D3) may be adjusted to 0.05 mm.

Compared with the case of D2−D3>0.6 mm, the case of D2−D3<0.6 mm can reduce the pressure difference force on the valve core component 10, and avoid the disadvantage for the reliability of opening the electric valve caused by the relatively thick wall of the lower section 311. In addition, when the valve core 31 is operated in a direction of opening the valve to be in a small opening-degree position (for example, the valve-opening pulse is 10% or less of the full opening pulse), the fluid is allowed to flow quickly between the lower section 311 and the sealing ring 22, thereby further improving the action performance of the electric valve. In addition, in the present embodiment, in a case that D1=16.2 mm, and D2−D3=0.2 mm, the action performance of the electric valve in forward and reverse directions is well guaranteed when the electric valve is a bidirectional valve, and the service life of the sealing ring 22 is also guaranteed.

Since the sealing ring 22 is made of a soft material such as rubber, the sealing ring 22 has certain elasticity, and is elastically deformed when subjected to an external force. The outer diameter D2 of the lower section 311 is set to be substantially uniform, and the inner diameter D3 of the lower section 311 is set to be substantially uniform. When the valve core 31 moves downward to abut against the first sealing portion 221 to close the electric valve, in order to control the contact area between the lower section 311 of the valve core 31 and the sealing ring 22 during the downward movement of the valve core 31, the size of the contact area is determined by the wall thickness (that is, the value of D2-D3) of the lower section 311. In order to prevent the reliability of opening and closing the valve by the valve core 31 from being affected by the change, caused by the change of the contact area, of the fluid pressure difference force received by the valve core 31, a height L of the lower section 311 of the valve core 31 is arranged to be equal to or greater than 0.4 mm.

Moreover, the valve core 31 further includes a transition portion 313, and the transition portion 313 is arranged between the body portion 312 and the lower section 311. In order to facilitate the control of the contact area between the lower section 311 of the valve core 31 and the sealing ring 22, the transition portion 313 includes a first transition section 3131 connected with the lower section 311, a longitudinal section of the first transition section 3131 is substantially cone-shaped, and as shown in FIG. 4A, an inner diameter of an upper end of the first transition section 3131 is smaller than an inner diameter of a lower end of the first transition section 3131. Specifically, a first acute angle α is formed between an inner wall of the first transition section 3131 and the horizontal direction. An outer diameter of the upper end of the first transition section 3131 is greater than an outer diameter of the lower end of the first transition section 3131. Specifically, a second acute angle β is formed between an outer wall of the first transition section 3131 and the horizontal direction. As shown in FIG. 3, the transition portion 313 further includes a second transition section 3132 connected with the body portion 312, an inner diameter of an upper end of the second transition section 3132 is smaller than an inner diameter of a lower end of the second transition section 3132, an outer diameter of the upper end of the second transition section 3132 is smaller than an outer diameter of the lower end of the second transition section, the outer diameter of the upper end of the second transition section 3132 is greater than the inner diameter of the lower section 311, and the outer diameter of the upper end of the second transition section 3132 is greater than the outer diameter of the lower section 311. With such arrangement, the axial projection circular line M of the outer edge of the second sealing portion 321 on the valve core 31 is located in the cross section of the lower section 311, which is beneficial to the force balance of the valve core component 30. It should be noted that the "force balance" herein refers to an almost balance, not necessarily an absolute balance, and if there is a slight unbalance of force, it can be adjusted by properly changing the force of the driving component of the electric valve.

The lower end of the longitudinal section of the lower section 311 of the valve core 31 is substantially arc-shaped, so as to reduce the wear of the sealing ring 22 from the valve core 31 and improve the service life of the sealing ring 22. It should be noted that in this solution, the lower end surface of the valve core 31 may not be arc-shaped. For example, the lower end surface of the valve core 31 is substantially small-plane-shaped. It should be noted that, in a case that the lower end of the longitudinal section of the lower section 311 is substantially arc-shaped, the arc part is relatively small, the outer diameter and the inner diameter of the whole lower section 311 are arranged to respectively have a uniform diameter, and the arc part has little effect on the overall structure of the lower section 311.

Figure 4B:
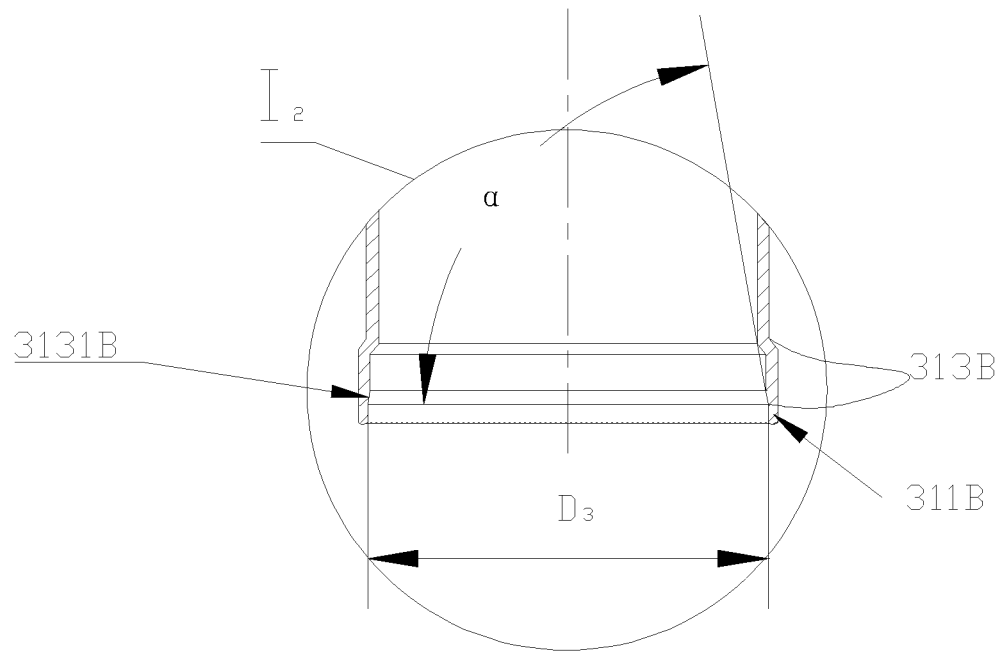
FIG. 4B is a schematic structural view of a first modified example at portion 12 in FIG. 3.
Figure 4C:
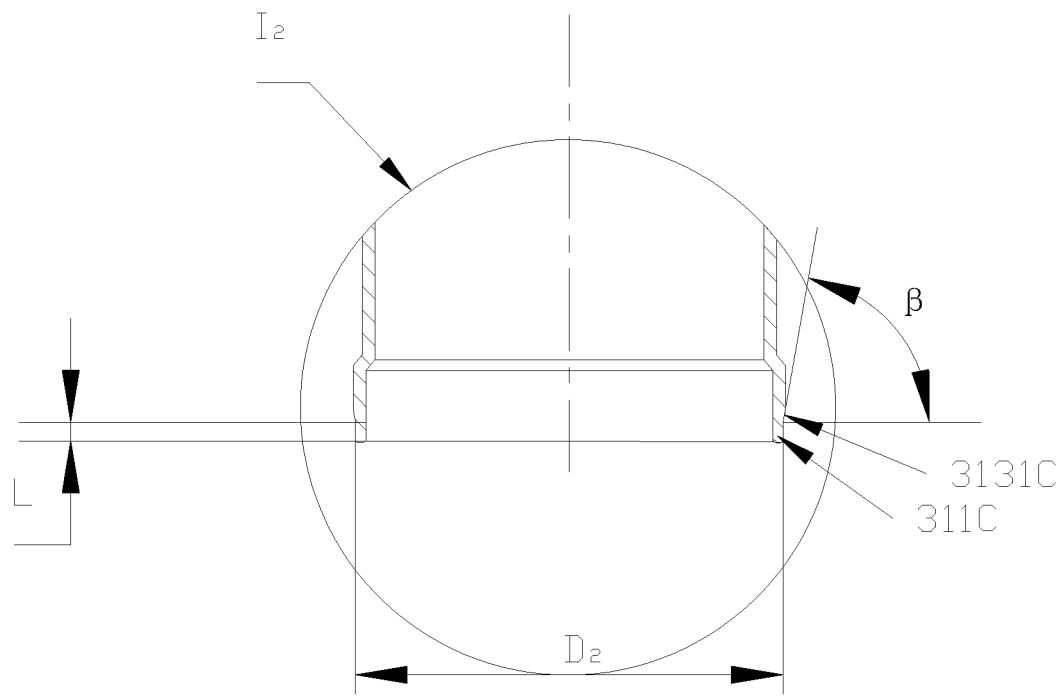
FIG. 4C is a schematic structural view of a second modified example at portion 12 in FIG. 3.
Figure 4D:
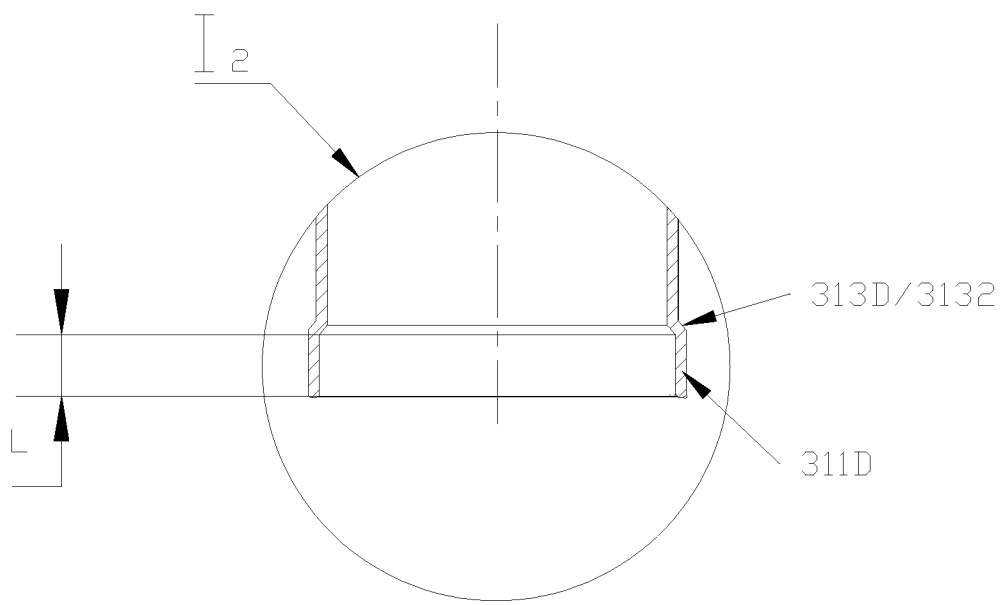
FIG. 4D is a schematic structural view of a third modified example at portion 12 in FIG. 3.

FIG. 4B is a schematic structural view of a first modified example of the valve core 31 at portion 12 in FIG. 3. In the valve core of this embodiment, the first transition section 3131B of the transition portion 313B is different from the structure of FIG. 4A in that the outer diameter of the first transition section 3131B is equal to the outer diameter of the lower section 311B. FIG. 4C is a schematic structural view of a second modified example of the valve core 31 at portion 12 in FIG. 3. In the valve core of this embodiment, the first transition section 3131C of the transition portion is different from the structure of FIG. 4A in that the inner diameter of the first transition section 3131C is equal to the inner diameter of the lower section 311C. The beneficial effects of such configuration are the same as those of the structure of the valve core in FIG. 4A, which will not be repeated here. FIG. 4D is a schematic structural view of a third modified example at portion 12 in FIG. 3. In the valve core of this embodiment, the transition portion 313D only has the second transition section 3132, and the first transition section in FIGS. 4A to 4C is not provided. However, in order to facilitate the control of the contact area between the lower section 311D of the valve core 31 and the sealing ring 22, the length L of the lower section 311D is relatively long, and L≥0.4 mm, to avoid the second transition section 3132 from pressing against the sealing ring 22.

As shown in FIG. 2, the valve seat component 20 further includes an inner bushing 25 and a pressure block 26. The valve seat 21 includes an axial through hole 27, and at least part of the inner bushing 25 is arranged in the axial through hole 27 and fixed to the valve seat 21 by welding. The sealing ring 22 is arranged between an outer side of the inner bushing 25 and the valve seat 21. The valve seat 21 includes a first stepped portion 215, and an upper end of the valve seat 21 fixes the pressure block 26 on a stepped surface of the first stepped portion 215 of the valve seat 21 by crimping. A lower end surface of the pressure block 26 is opposite to an upper end surface of the sealing ring 22, to further axially limit the sealing ring 22. It is understandable that the lower end surface of the pressure block 26 may abut against the sealing ring 22 or not. The pressure block 26 includes a base portion 261 and a guide portion 262. An inner diameter of the guide portion 262 is greater than an inner diameter of the base portion 261. When the lower section 311 is abutted against the first sealing portion 221 of the sealing ring 22, the lower section 311 of the valve core 31 is in clearance fit with the inner bushing 25 and the base portion 261 of the pressure block 26. The clearance fit here means that in an ideal state, the valve core 31 is in clearance fit with the inner bushing 25 and the pressure block 26 in order to avoid interference. However, considering factors such as assembly and process, the following undesirable situation may exist: the valve core 31 interferes with the inner bushing 25 or the pressure block 26 instead of forming clearance fit. In addition, an inner diameter of the guide portion 262 gradually increases from bottom to top, that is, an inner hole of the guide portion 262 gradually expands from bottom to top. In this way, the axial movement of the valve core 31 is guided by an inner side of the guide portion, and a flow guiding space Q is formed between an outer side of the valve core 31 and an inner wall of the pressure block 26 when the end of the lower section 311 of the valve core 31 is abutted against the first sealing portion 221 of the sealing ring 22, which is beneficial to the flow of fluid. In addition, during the axial movement of the valve core 31 relative to the pressure block 26, the two may cooperate to adjust the flow rate, which is convenient and low in cost.

The electric valve according to the embodiments herein may be an electric valve with a bidirectional flow function, that is, when the electric valve is opened, the flow direction of the fluid is to flow in from the second fluid port A and flow out from the first fluid port B (referred to as forward direction hereinafter), or when the electric valve is opened, the flow direction of fluid is to flow in from the first fluid port B and flow out from the second fluid port A (referred to as reverse direction hereinafter). The electric valve of the embodiments may only allow unidirectional flow.

In the embodiment shown in FIG. 1, when the electric valve is in the closed state, the axial projection circular line M of the second sealing portion 321 on the valve core 31 substantially coincides with the central circular line of the cross section of the lower section 311. Such a design is beneficial to the force balance of the valve core component 30. Moreover, when the diameter D1 of the outer edge of the axial projection circular line M of the second sealing portion 321 on the valve core 31 and the value of D2-D3 are known, the values of D2 and D3 can be designed conveniently and easily according to this design.

Figure 5A:
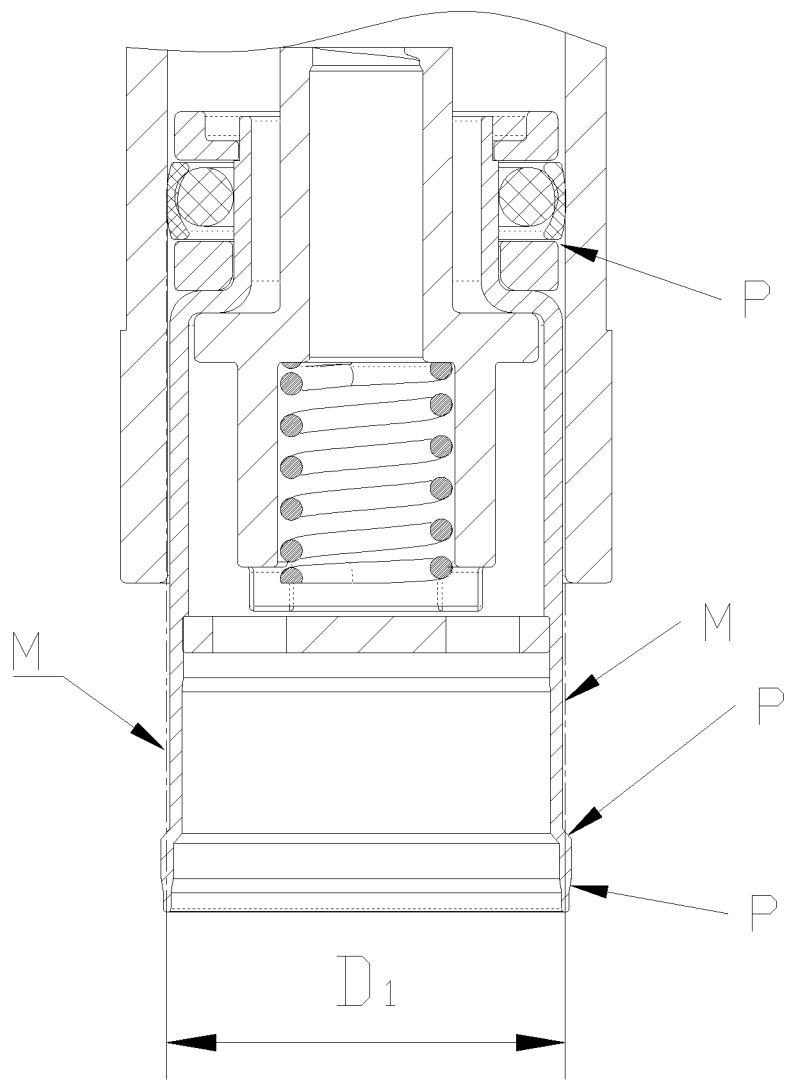
FIG. 5A is a schematic diagram of the force analysis of the valve core component when the fluid enters in a forward direction.
Figure 5B:
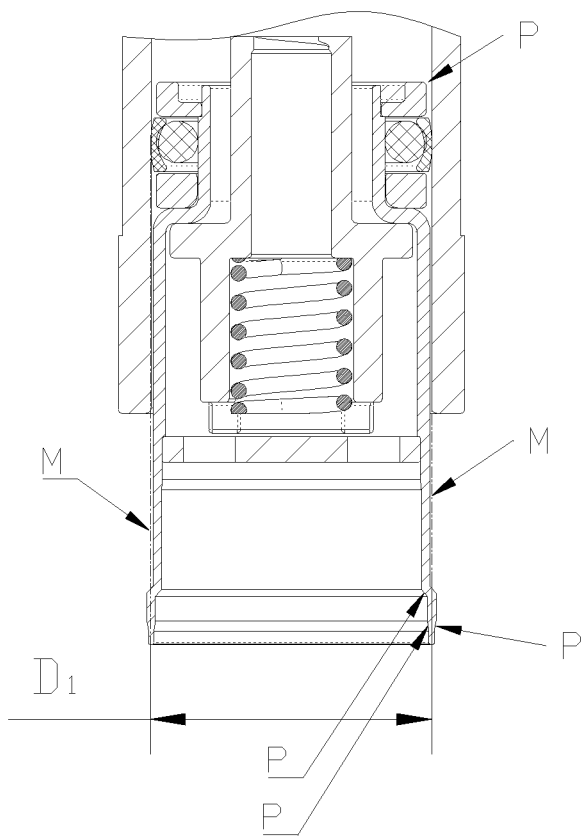
FIG. 5B is a schematic diagram of the force analysis of the valve core component when the fluid enters in a reverse direction.

FIG. 5A is a schematic diagram of the force analysis of the valve core component when the fluid enters in the forward direction, and FIG. 5B is a schematic diagram of the force analysis of the valve core component when the fluid enters in the reverse direction.

As shown in FIGS. 5A and 5B, when the fluid with pressure P flows in the forward direction, the main pressure difference force on the valve core component 30 is $F_{forward}=P\pi(D2^2-D1^2)$ in the closed state, and the acting direction of the force is downward; when the fluid with pressure P flows in the reverse direction, the main pressure difference force on the valve core component 30 is $F_{reverse}=P\pi(D1^2-D3^2)$ in the closed state, and the acting direction of the force is downward, which is beneficial to the reliability of closing the valve and also beneficial to reducing the internal leakage when the electric valve is closed.

When the size of structure other than the valve core of the electric valve is fixed, that is, when D1 is fixed, D1*(D2−D3)>=6 mm². There are three following situations which can cause the (D2−D3) to increase: first, D2 remains unchanged, and D3 decreases; second, D2 increases, D3 remains unchanged; and third, both D2 and D3 increase.

In a case that D2 remains unchanged and D3 decreases, $F_{forward}$ is basically unchanged, and $F_{reverse}$ increases, that is, when the fluid flows in the forward direction, this case has little effect on the opening and closing actions of the electric valve; when the fluid flows in the reverse direction, the resistance of opening the electric valve increases, which is not beneficial to the reliability of opening the electric valve when the fluid flows in the reverse direction, and the greater the value of D2−D3, the greater the adverse effect.

In a case that D2 increases and D3 remains unchanged, $F_{forward}$ increases, and $F_{reverse}$ is basically unchanged, that is, when the fluid flows in the forward direction, the resistance of opening the electric valve increases, which is not beneficial to the reliability of opening the electric valve when the fluid flows in the forward direction, and the greater the value of D2-D3, the greater the adverse effect; when the fluid flows in the reverse direction, this case has little effect on the opening and closing actions of the electric valve.

In a case that both D2 and D3 increase, $F_{forward}$ increases, and $F_{reverse}$ decreases, that is, when the fluid flows in the forward direction, the resistance of opening the electric valve increases, which is not beneficial to the reliability of opening the electric valve when the fluid flows in the forward direction, and the greater the value of D2-D3, the greater the adverse effect; when the fluid flows in the reverse direction, this case is beneficial to the opening action of the electric valve.

Therefore, the electric valve according to this solution is designed with $1\ mm^2 \leq D1*(D2-D3) \leq 6\ mm^2$, so that in a case that the electric valve is a bidirectional electric valve, the reliability of opening the electric valve in the forward and reverse directions is controlled to an acceptable degree, while the performance of the internal leakage and the reliability of closing the electric valve are improved.

The above design is also beneficial to the serialization of products, that is, in a case that D1 is determined, the value range of D2-D3 can be calculated through the above numerical relationship, that is, the wall thickness of the lower section 311 of the valve stem can be obtained. Similarly, in a case that the range of D2-D3 is determined, the value range of D1 can be calculated through the above numerical relationship.

It should be noted that, on the basis of the description of the foregoing technical solutions, the electric valve according to the embodiments may be an electronic expansion valve which can regulate the fluid flow, or an on-off valve, such as a solenoid valve or a bidirectional solenoid valve.

Figure 6:
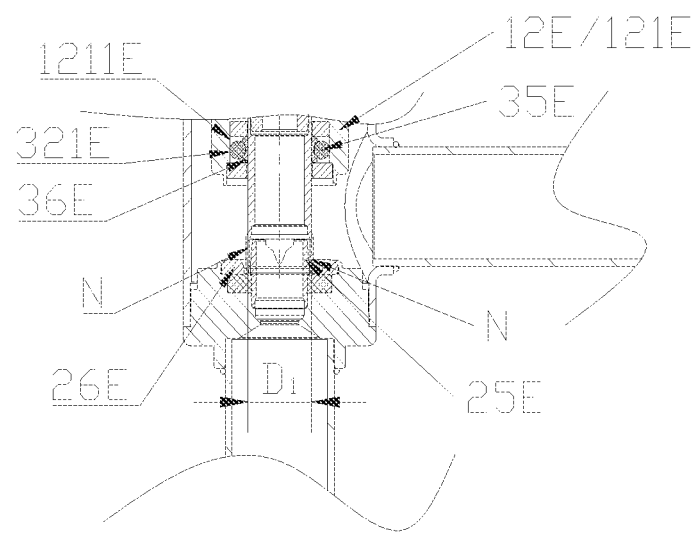
FIG. 6 is a schematic structural view of the electric valve provided according to the second embodiment of the present disclosure.
Figure 7:
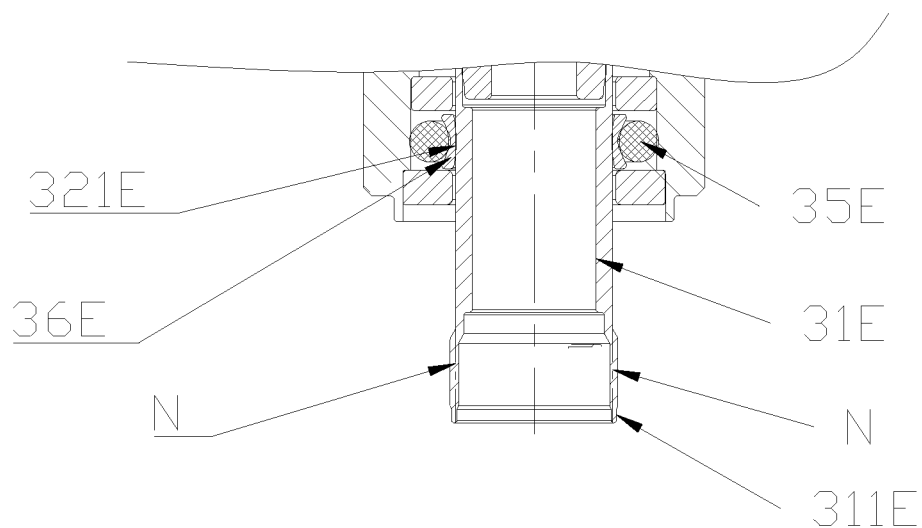
FIG. 7 is a partial schematic structural view of FIG. 6.
Figure 8:
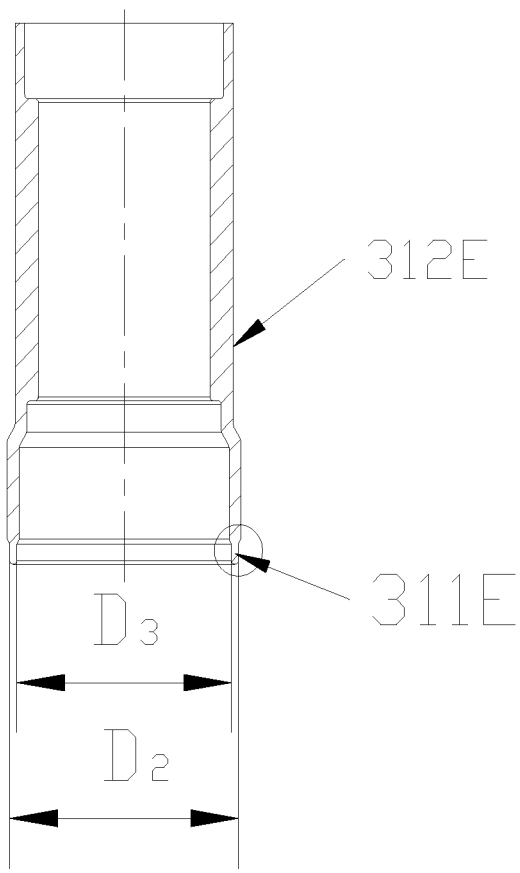
FIG. 8 is a schematic structural view of the valve core in FIG. 6.

FIG. 6 is a schematic structural view of the electric valve provided according to the second embodiment of the present disclosure. FIG. 7 is a partial schematic structural view of FIG. 6. FIG. 8 is a schematic structural view of the valve core in FIG. 6.

The difference between the electric valve in this embodiment and the electric valve in the previous embodiment lies in that, the sealing assembly is a part of a sealing seat component, and the valve core component is in sliding fit with the sealing assembly. The valve core includes the second sealing portion. Detailed description is given below.

As shown in FIGS. 6 to 8, the valve seat component further includes an inner bushing 25E and a pressure block 26E. A bushing component 12E includes a bushing 121E and a sealing assembly, and the bushing 121E includes a second tubular portion 1211E (only part is shown in the figure). The sealing assembly is fixed or limited on the bushing 121E, and the sealing assembly includes a sealing ring 35E and a gasket 36E. The valve core 31E includes a body portion 312E and a lower section 311E, at least part of the gasket 36E is abutted against an inner wall of the body portion 312E, and the sealing ring 35E is abutted against an inner wall of the bushing 121E. The body portion 312E is slidable relative to the sealing assembly. The body portion 312E has a substantially uniform outer diameter. An outer wall of the body portion 312E includes a second sealing portion 321E. The diameter of an axial projection circular line N of the outer wall of the body portion 312E on the valve core 31E is D1. The inner diameter of the lower section 311E of the valve core 31E is substantially uniform, and the outer diameter of the lower section 311E is substantially uniform. The outer diameter of the lower section 311E is D2, and the inner diameter of the lower section 311E is D3. The diameter D1, the outer diameter D2 of the lower section 311E, and the inner diameter D3 of the lower section satisfy: $1\ mm^2 \leq D1*(D2-D3) \leq 6\ mm^2$. Other structures of this embodiment can be understood with reference to the first embodiment. The various variations and the force relationship of the lower section in the first embodiment are also applicable to this embodiment. Accordingly, this embodiment also has the same beneficial effects as the first embodiment, which can be understood with reference to the first embodiment and will not be repeated here. More specifically, in this embodiment, D1=9.2 mm, D2-D3=0.5 mm. The action performance of the electric valve in forward and reverse directions is well guaranteed when the electric valve is a bidirectional valve, and the service life of the sealing ring 22 is also guaranteed.

Figure 9:
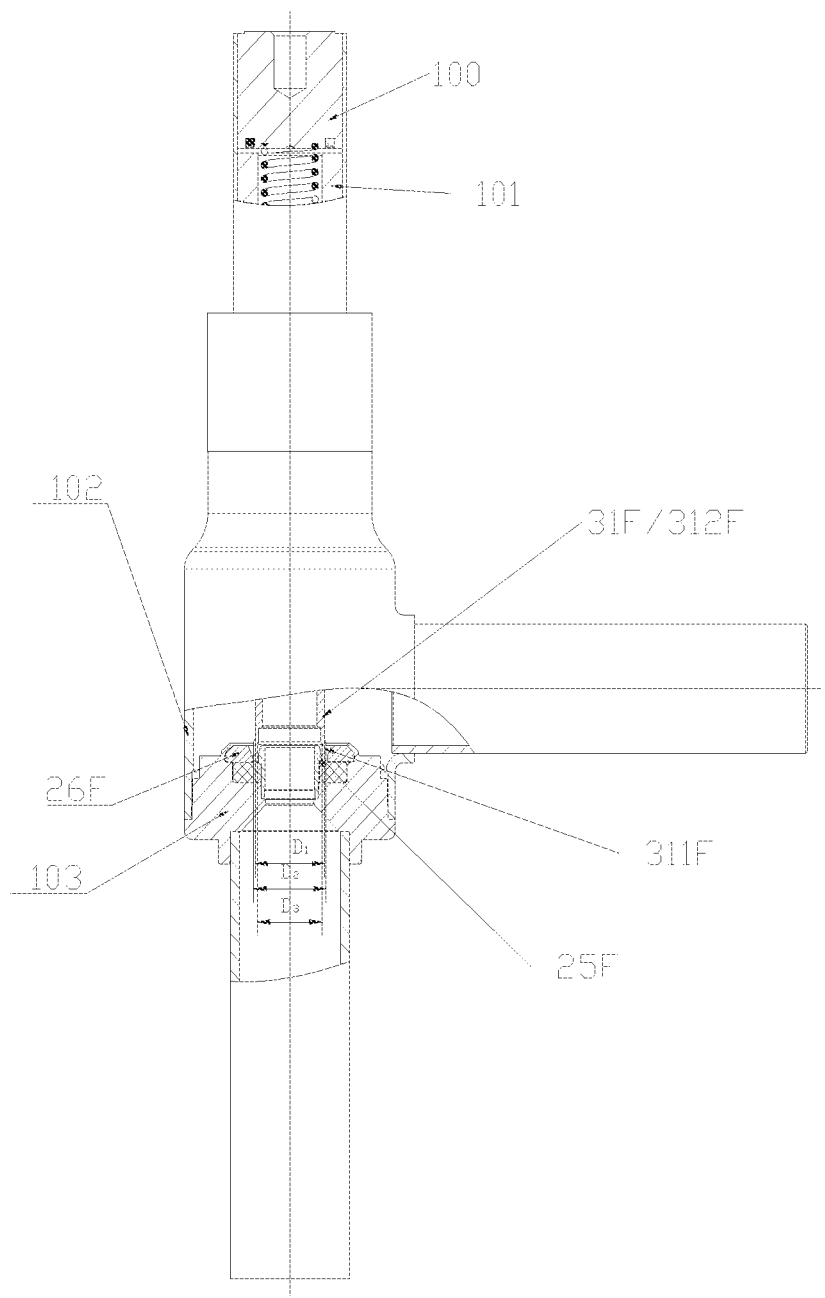
FIG. 9 is a schematic structural view of the electric valve provided according to the third embodiment of the present disclosure.
Figure 10:
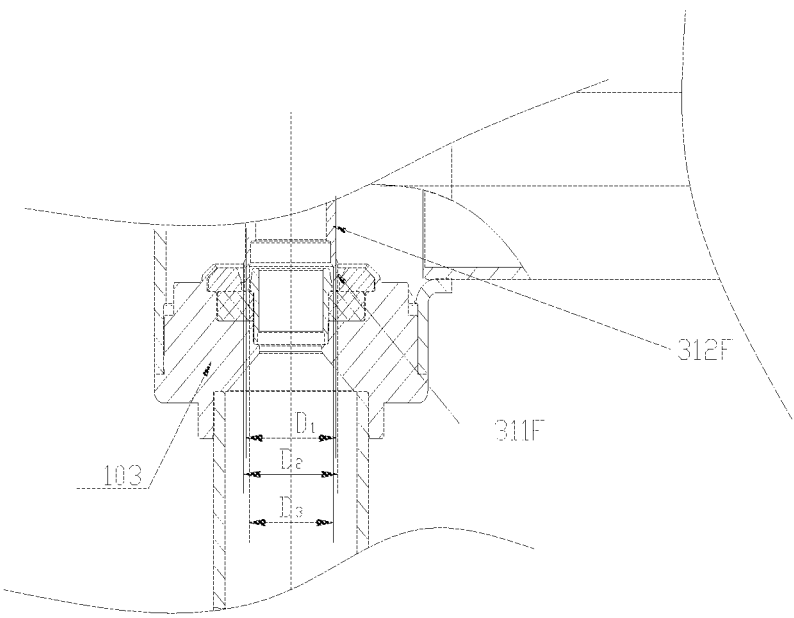
FIG. 10 is a partial schematic structural view of the electric valve in FIG. 9.
Figure 11:
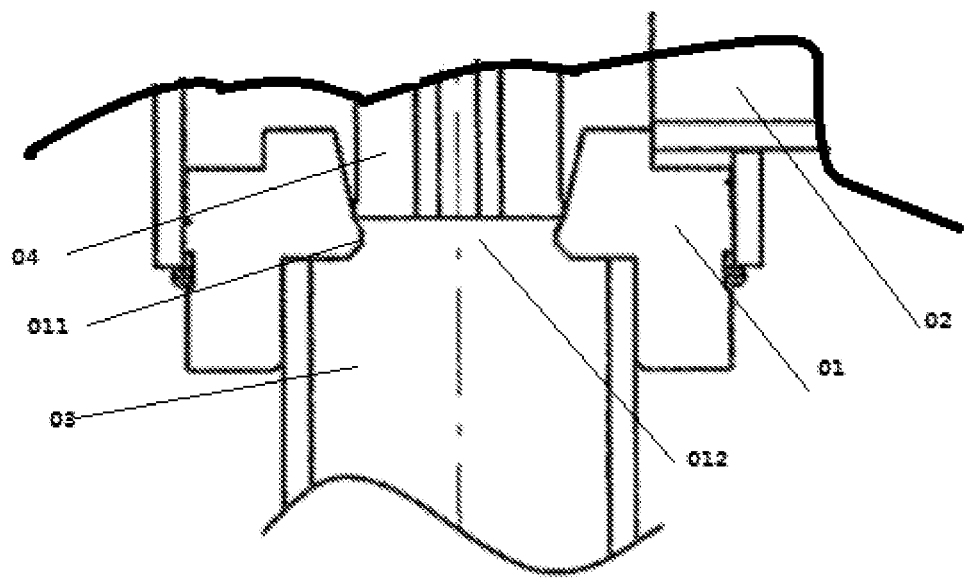
FIG. 11 is a schematic diagram of a partial structure of an electric valve in the background technology.

FIG. 9 is a schematic structural view of the electric valve provided according to the third embodiment of the present disclosure. FIG. 10 is a partial schematic structural view of the electric valve in FIG. 9.

As shown in the figure, the electric valve is specifically a solenoid valve, which includes a plug 100 and a moving iron core 101. The plug 100 and the moving iron core 101 are the components of a driving component. The valve body component 102 is fixed to the valve seat component 103 by welding, and a valve core 31F includes a body portion 312F and a lower section 311F. The valve seat component includes an inner bushing 25F and a pressure block 26F. In this embodiment, an outer wall of the body portion 312F is designed to have a uniform diameter, and the outer wall is used as a second sealing portion. A diameter D1 of the second sealing portion, an outer diameter D2 of the lower section 311F, and an inner diameter D3 of the lower section 311F satisfy: $1\ mm^2 \leq D1*(D2-D3) \leq 6\ mm^2$. The solenoid valve can also achieve the same function of reducing the internal leakage when the electric valve is closed as the foregoing embodiments, and other structures of the solenoid valve may be designed with reference to the foregoing embodiments, and the design may also be modified within the framework of the principle of the present application, which will not be repeated here.

The electric valve according to the present application is described in detail hereinbefore. The principle and the embodiments of the present application are illustrated herein by specific examples. The above description of examples is only intended to facilitate the understanding of the method and spirit of the present application. It should be noted that, for those skilled in the art, many modifications and improvements may be made to the present disclosure without departing from the principle of the present disclosure, and these modifications and improvements are also deemed to fall into the protection scope of the present disclosure defined by the claims.

The invention claimed is:

1. An electric valve, comprising a valve seat component, and a valve core component, wherein
   the valve seat component comprises a valve seat and a sealing ring;
   the valve core component comprises a valve core, the valve core comprises a lower section, and the lower section is annular;
   the valve seat component further comprises an inner bushing and a pressure block, the valve seat comprises an axial through hole, and at least part of the inner bushing is arranged in the axial through hole;
   the sealing ring is arranged between an outer side of the inner bushing and the valve seat;
   the valve seat comprises a first stepped portion, and a lower end surface of the pressure block is abutted against the first stepped portion and/or the sealing ring.

2. The electric valve according to the claim 1, wherein the sealing ring is made of a soft material, a lower end surface of the pressure block is configured to axially limit the sealing ring, the sealing ring comprises a first sealing portion, and an end of the lower section is configured to abut against or separate from the first sealing portion to allow a second fluid port of the electric valve to communicate with a first fluid port of the electric valve or not.

3. The electric valve according to the claim 1, wherein the valve seat is fixed with the pressure block by crimping, the pressure block comprises a base portion abutting against the sealing ring and a guide portion arranged above the base portion, an inner diameter of the guide portion gradually increases from bottom to top; when the end of the lower section is abutted against the sealing ring, the lower section is in a clearance fit with the inner bushing and the base portion.

4. The electric valve according to the claim 1, further comprising a valve body component, wherein the valve body component comprises a bushing component, the valve core component comprises a second sealing portion, the valve core component is in a sliding fit with the bushing component through the second sealing portion, and the second sealing portion is configured to abut against an inner wall of the bushing component;

the valve core component is arranged in an inner chamber of the valve body component, the inner chamber comprises a first chamber located above the valve core component, and the valve core component comprises an equalizing flow path;

the lower section has an outer diameter D2 and an inner diameter D3; a height L of the lower section is equal to or greater than 0.4 mm, and D2 and D3 satisfy the following relationship: 0.1 mm<D2−D3<0.6 mm.

5. The electric valve according to the claim 1, further comprising a valve body component, wherein the valve body component comprises a bushing component, the valve core component comprises a second sealing portion, the valve core component is in a sliding fit with the bushing component through the second sealing portion, and the second sealing portion is configured to abut against an inner wall of the bushing component;

the valve core component is arranged in an inner chamber of the valve body component, the inner chamber comprises a first chamber located above the valve core component, and the valve core component comprises an equalizing flow path;

the lower section has an outer diameter D2 and an inner diameter D3; a height L of the lower section is equal to or greater than 0.4 mm, and D2 and D3 satisfy the following relationship: 0.05 mm≤D2−D3<0.6 mm.

6. The electric valve according to the claim 1, wherein the valve core comprises a transition portion, the transition portion comprises a first transition section connected with the lower section, and an inner diameter of an upper end of the first transition section is smaller than an inner diameter of a lower end of the first transition section.

7. The electric valve according to the claim 1, wherein the valve core comprises a transition portion, the transition portion comprises a first transition section connected with the lower section, and an outer diameter of an upper end of the first transition section is greater than an outer diameter of a lower end of the first transition section.

8. The electric valve according to the claim 1, wherein the valve core further comprises a body portion, a transition portion is comprised between the body portion and the lower section, the transition portion comprises a first transition section connected with the lower section, an inner diameter of an upper end of the first transition section is smaller than an inner diameter of a lower end of the first transition section, and an outer diameter of the upper end of the first transition section is greater than an outer diameter of the lower end of the first transition section.

9. The electric valve according to the claim 4, wherein the valve core component further comprises a sealing assembly, the bushing component comprises a first tubular portion which is substantially tubular, the sealing assembly is abutted between an outer wall of the valve core and an inner wall of the first tubular portion, the sealing assembly comprises the second sealing portion, and the second sealing portion is in a sliding fit with the inner wall of the first tubular portion.

10. The electric valve according to the claim 9, wherein the sealing assembly comprises a sealing ring and a gasket, the valve core further comprises a body portion, the body portion comprises a small-diameter section and a large-diameter section, the sealing ring is arranged between the gasket and the small-diameter section, the gasket comprises the second sealing portion, the valve body component further comprises a valve body, the bushing component comprises a bushing fixed to the valve body by welding, the bushing comprises the first tubular portion, and the first tubular portion has a substantially uniform inner diameter.

11. The electric valve according to the claim 9, wherein the bushing component comprises a bushing and a sealing assembly, the valve body component further comprises a valve body, the bushing is fixed to the valve body by welding, the bushing comprises a second tubular portion, the valve core further comprises a body portion, the sealing assembly is abutted between an inner wall of the second tubular portion and an outer wall of the body portion, the body portion has a substantially uniform outer diameter, and the body portion comprises the second sealing portion.

12. The electric valve according to the claim 11, wherein the sealing assembly comprises a sealing ring and a gasket, the sealing ring is arranged between the gasket and the second tubular portion, and at least part of the gasket abuts against the outer wall of the body portion.

13. The electric valve according to claim 1, wherein the electric valve is an electronic expansion valve or a solenoid valve.

14. The electric valve according to claim 13, wherein the electronic expansion valve is a bidirectional electronic expansion valve, and the solenoid valve is a bidirectional solenoid valve.

* * * * *